United States Patent
Wang et al.

(10) Patent No.: US 7,449,680 B2
(45) Date of Patent: Nov. 11, 2008

(54) NON-UNIFORMITY ENERGY CORRECTION METHOD AND APPARATUS

(75) Inventors: Sharon Xiaorong Wang, Hoffman Estates, IL (US); James Frank Caruba, Bartlett, IL (US); Ronald E. Malmin, Chicago, IL (US); Anthony P. DelMedico, Niles, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 0 days.

(21) Appl. No.: 11/414,092

(22) Filed: Apr. 28, 2006

(65) Prior Publication Data
US 2007/0252079 A1    Nov. 1, 2007

(51) Int. Cl.
*G01D 18/00* (2006.01)
(52) U.S. Cl. .................................... 250/252.1
(58) Field of Classification Search ................. 250/252, 250/1, 363.09
See application file for complete search history.

(56) References Cited

U.S. PATENT DOCUMENTS

| 4,323,977 | A | * | 4/1982 | Arseneau ..................... 382/275 |
| 4,808,826 | A | * | 2/1989 | Lim et al. .............. 250/363.01 |
| 4,866,615 | A | * | 9/1989 | Ichihara ................. 250/363.07 |
| 4,899,054 | A | * | 2/1990 | Barfod ........................ 250/369 |
| 5,371,672 | A | * | 12/1994 | Motomura et al. .......... 600/431 |
| 2005/0072928 | A1 | | 4/2005 | Wang et al. |

* cited by examiner

*Primary Examiner*—David P. Porta
*Assistant Examiner*—Kiho Kim
(74) *Attorney, Agent, or Firm*—Peter L. Kendall (57) ABSTRACT

A method and apparatus for acquiring total uniformity for a scintillation imaging apparatus are provided. A generic energy (Z) map is first obtained. The generic Zmap is then corrected for linearity by use of a dot pattern. The listmode data is used to construct an energy histogram matrix. A twin Zmap is then obtained by optimizing the lower and upper boundaries of the energy window for each pixel in relation to the average energy over the Center Field of View.

18 Claims, 6 Drawing Sheets

NON-UNIFORMITY ENERGY CORRECTION METHOD AND APPARATUS

BACKGROUND OF THE INVENTION

1. Field of the Invention

The present invention generally relates to nuclear medicine devices, in particular the calibration of scintillation cameras to correct for non-uniformities in energy distribution as a function of position across the camera field of view.

2. Description of the Background Art

Nuclear medicine is a unique medical specialty wherein radiation is used to acquire images that show the function and anatomy of organs, bones or tissues of the body. Radiopharmaceuticals are introduced into the body, either by injection or ingestion, and are attracted to specific organs, bones or tissues of interest. Such radiopharmaceuticals produce gamma photon emissions that emanate from the body. One or more detectors are used to detect the emitted gamma photons, and the information collected from the detector(s) is processed to calculate the position of origin of the emitted photon from the source (i.e., the body organ or tissue under study). The accumulation of a large number of emitted gamma photons allows an image of the organ or tissue under study to be displayed.

The detector or camera of the "Anger" type is generally comprised of a scintillation crystal and an array of photomultiplier tubes. The radiation photons interact with the scintillation crystal, which in turn produces light events or flashes of multiple light photons. The light from the crystal is detected by the array of photomultiplier tubes, which outputs a signal proportional to the energy of the incident gamma. The signal is then processed by a computer and stored as image data in a memory, which data is in turn translated into an image for viewing on a display monitor or printed out as a hard copy.

However, inaccuracies are introduced into the camera imaging due to the manufacturing process as well as the physical characteristics of the detecting apparatus. The major distortions are linearity errors, or spatial distortion, and energy non-uniformity across the face of the crystal. Spatial distortion generally arises from the fact that the geometric coordinates of light events occurring either at the edges of or between adjacent photomultiplier tubes in a photodetector array will be computed differently than the coordinates of events occurring directly over the center of a photomultiplier tube, due to the physical limitations of the photomultiplier tube. Therefore, when a radiation source interacts with the scintillation crystal at one x-y coordinate, it will appear in the image as a different x-y coordinate. Linearity correction methods to remedy such distortions, such as disclosed in U.S. Pat. No. 3,745,345 to Muehllehner, (incorporated herein by reference) generally are known in the art. Similarly, energy non-uniformity corrections also are generally known in the art, as disclosed in U.S. Pat. No. 4,323,977 to Arseneau (incorporated herein by reference).

Uniformity distortions are present when the sensitivity of the detector to the energy of incident photons varies across the face of the crystal depending on its coordinate position, as opposed to energy variations in the radiation source. Addressing non-uniformity during manufacture would not be practicable and would drive up cost. However, uniformity is one of the most important specifications of gamma cameras and is used as a major indicator of image quality.

During scanning of a radiation source, there may be emissions or scattered events from unwanted sources, which if recorded can negatively affect the precision of the resulting image. Energy windows have been employed to prevent the recordation of energy events outside the window, thereby accepting only radiation emissions of a specified energy, which are added to the image data being accumulated. However, due to non-uniformities across the scintillation crystal, emissions with appropriate energy may appear to fall outside the energy window and so will not be recorded by the apparatus, thereby introducing image deterioration.

Current methods that attempt to correct non-uniformity, such as the so-called gradient procedure, improve uniformity but at the expense of linearity. Often, as uniformity is improved, the linearity distortion increases as well. Current methods do not adequately address the relationship between energy correction and linearity correction. If uniformity is corrected before linearity correction, uniformity correction cannot be achieved in totality. Consequently there exists a need in the art for achieving total uniformity while not compromising the linearity correction.

SUMMARY OF THE INVENTION

Embodiments of the current invention decouple geometric and energy correction to maximize optimal linearity and uniformity characteristics of a nuclear medicine imaging apparatus. Advancements in computing power, such as the recently developed Foresight hardware, enable more sophisticated algorithms in real time computation than have been previously allowed. Such newly available computational abilities enable new methodologies and systems for correcting distortions.

Embodiments of the present invention enable calibration of scintillation devices providing for linearity correction while achieving total uniformity. This is realized by use of a scintillation camera and a processor unit. First a generic energy map (GZmap) is obtained, which normalizes the energy for each event position. A linear correction is then applied to the generic Zmap to correct geometrical distortions, by use of dot pattern imaging. With use of the corrected generic Zmap, listmode flood data can be framed as an energy histogram matrix, wherein the spectrum of each pixel can be described, and is therefore a 3D matrix. A Twin Zmap (TZmap) then can be constructed by optimizing the boundaries of the energy window for each pixel, such that the energy of each pixel is equal to the average energy over the center field of view. This calibration is conducted using Co57, and therefore the energy spectrum can be scaled to achieve the same uniformity with other radiation source types.

BRIEF DESCRIPTION OF THE DRAWINGS

Embodiments of the present invention are shown by way of example and not limitation in the accompanying figures, in which.

DETAILED DESCRIPTION OF THE EXEMPLARY EMBODIMENTS

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

Figure 1:
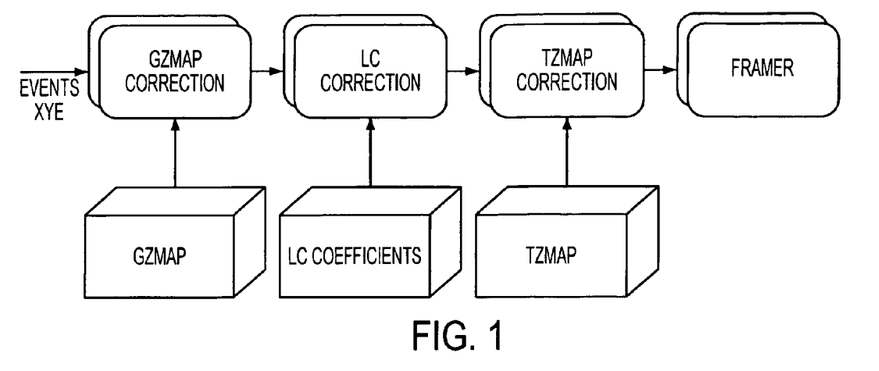
FIG. 1 is flow chart of the correction process before event framing.

One embodiment of an overall process according to the present invention is shown in FIG. 1. As shown, the major corrective steps involved in the invention begin with applying to individual event data (comprising X, Y spatial coordinates and Z energy signal) a generic energy map correction (GZmap) to normalize the Z signal for each event, followed by a linearity correction (LC) using linearity correction coefficients to correct spatial distortion errors, which is followed by a Twin Zmap correction (TZmap), to calibrate total uniformity, wherein the event is then ready for framing.

Figure 2:
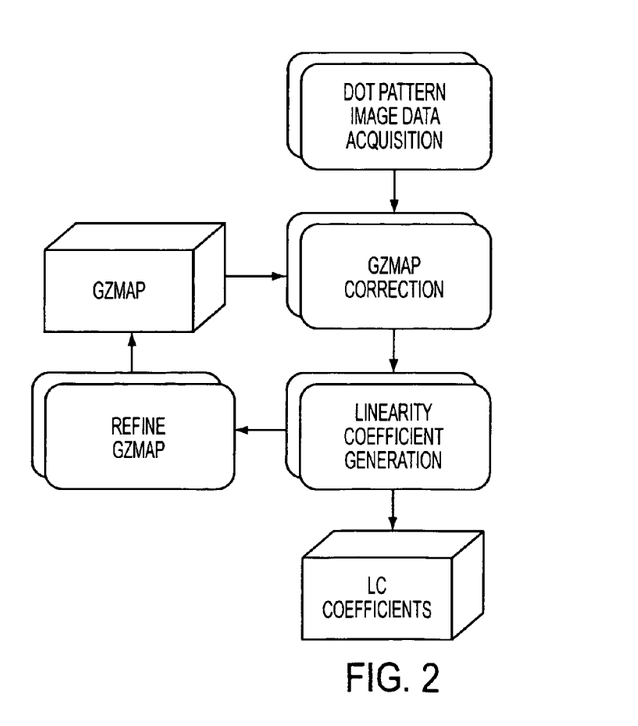
FIG. 2 is a flow chart of the calibration process for building the corrected generic Zmap.

One calibration process to build a corrected GZmap in accordance with an embodiment of the present invention is shown in FIG. 2. First, an initial generic energy map is obtained by either testing a specific detector or by integrating an existing GZmap for that detector type. Methods for obtaining such a GZmap are already known in the art, such as use of a flood field source, wherein a source emits a uniform radiation level which is then detected by the camera and then corrected for non-uniformity. Accordingly no further discussion of such basic non-uniformity correction will be made herein. If an existing GZmap is used, it must account for the characteristics of the type of detector being calibrated.

After the initial GZmap is obtained, it is corrected for linearity errors. A dot pattern image is acquired, wherein radiation sources are arranged in a particular pattern for detection by the scintillation crystal. This arrangement of the dot pattern is known and can be compared to the obtained image to calculate the resulting distortion. The detected dot pattern is corrected by the initial GZmap, and then compared with the known dot pattern to identify linearity distortions and generate Linearity Correction (LC) coefficients. The LC coefficients then are applied to the initial GZmap to result in a refined GZmap.

Figure 3A:
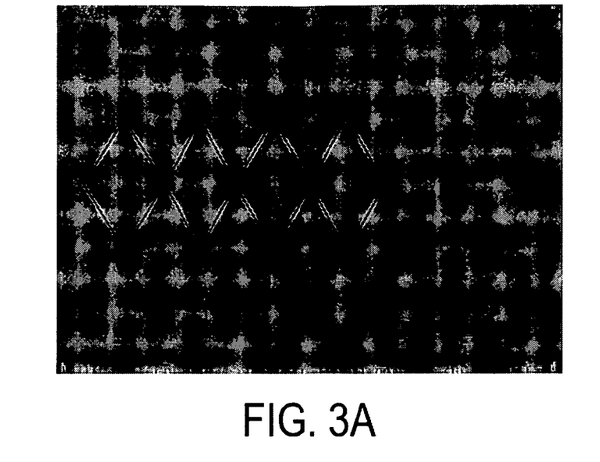
FIG. 3(a) shows the grids obtained by the linearity dot pattern associated with the initial generic Zmap.
Figure 3B:
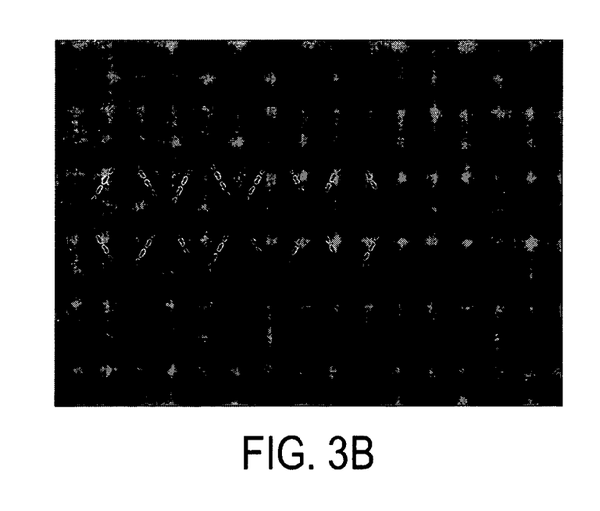
FIG. 3(b) shows grids obtained from the linearity dot pattern images.
Figure 3C:
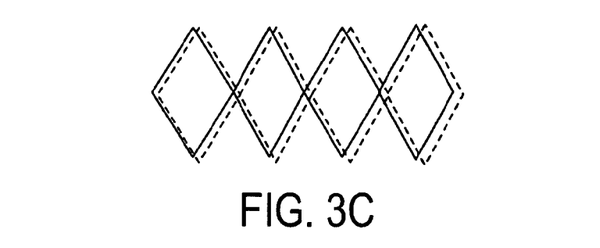
FIG. 3(c) illustrates grid warping.

One embodiment of this process is illustrated more specifically in FIG. 3. A set of grids is obtained through the linearity dot pattern associated with the initial GZmap as shown in FIG. 3(a). A new set of grids is then extracted from the linearity dot pattern images as shown in FIG. 3(b). As shown in FIG. 3(c), the GZmap is then "warped" according to the grid difference using a morphological transformation. This transformation may be expressed as $$\hat{x} = r(x, y) \quad (1)$$

and $$\hat{y} = s(x, y) \quad (2)$$

For each quadrilateral region in the initial GZmap, the corresponding grid from the dot pattern can be identified. Using the two sets of grids, a pair of bilinear equations can be modeled so that $$r(x, y) = c_1 x + c_2 y + c_3 xy + c_4 \quad (3)$$

and $$s(x, y) = c_5 x + c_6 y + c_7 xy + c_8 \quad (4)$$

Since there are a total of eight known tie points, four on the mesh of the initial GZmap matrix and four on the measured detector matrix, these equations can be easily solved for the eight coefficients $c_i$, wherein i=1, 2, . . . 8. The coefficients constitute the model used to transform all pixels within the quadrilateral region characterized by the tie points used to obtain the coefficients.

Finally, the warped GZmap matrix can be expressed as $$\hat{Z} = z(\hat{x}, \hat{y}) \quad (5)$$

Figure 4:
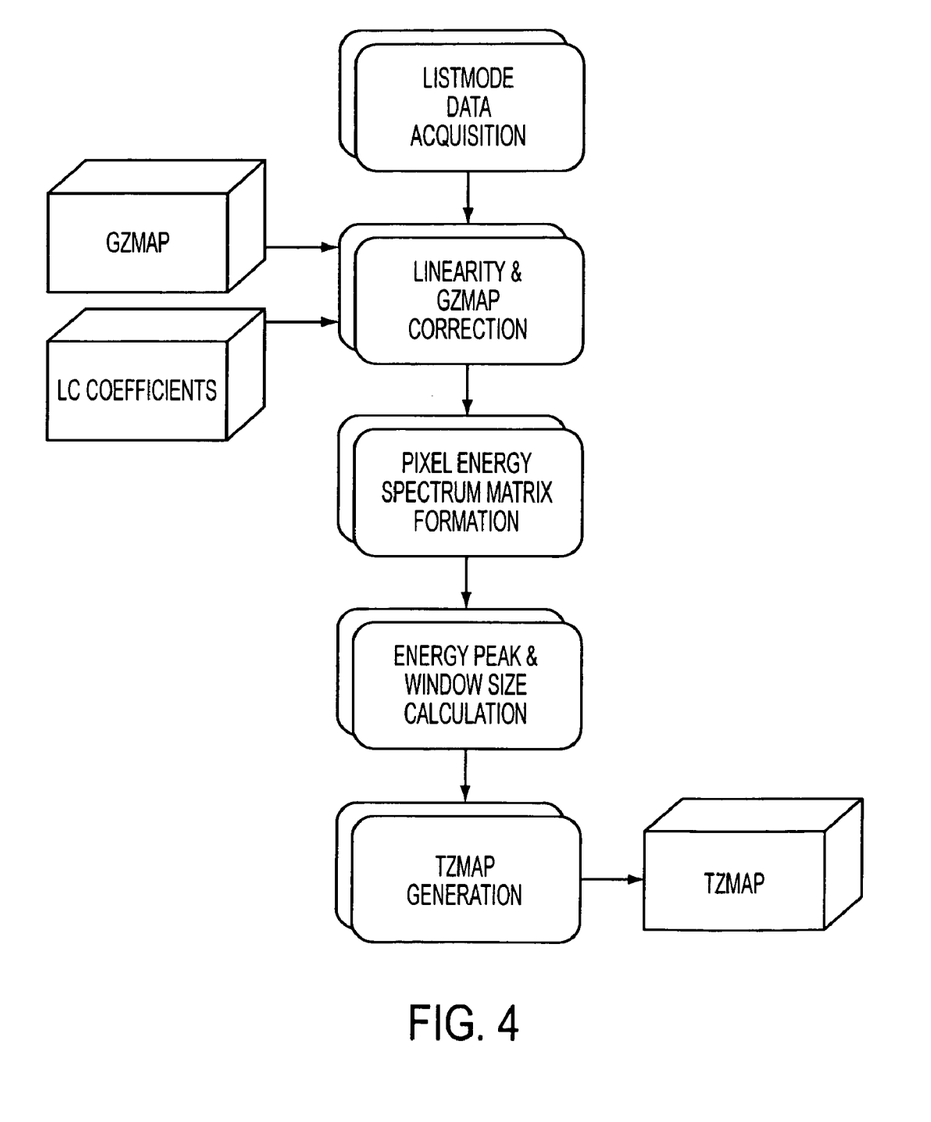
FIG. 4 is a flow chart of the calibration process for building the Twin Zmap.

Correcting the initial GZmap for linearity produces the refined GZmap, whereafter TZmap calibration then can be performed. One embodiment of the calibration process for building a TZmap is shown in FIG. 4. First, a point source is set to acquire a set of listmode flood data. Applying the GZmap and linearity correction, the flood can be framed as an energy histogram matrix. This energy histogram matrix describes the spectrum of each pixel and is therefore a 3D matrix.

The energy peak of the spectrum is then located, and the window size is adjusted such that the area under each pixel is equal. From this, the flood uniformity can be obtained. Normalizing the window boundaries to unit energy gives the TZmap.

Figure 5:
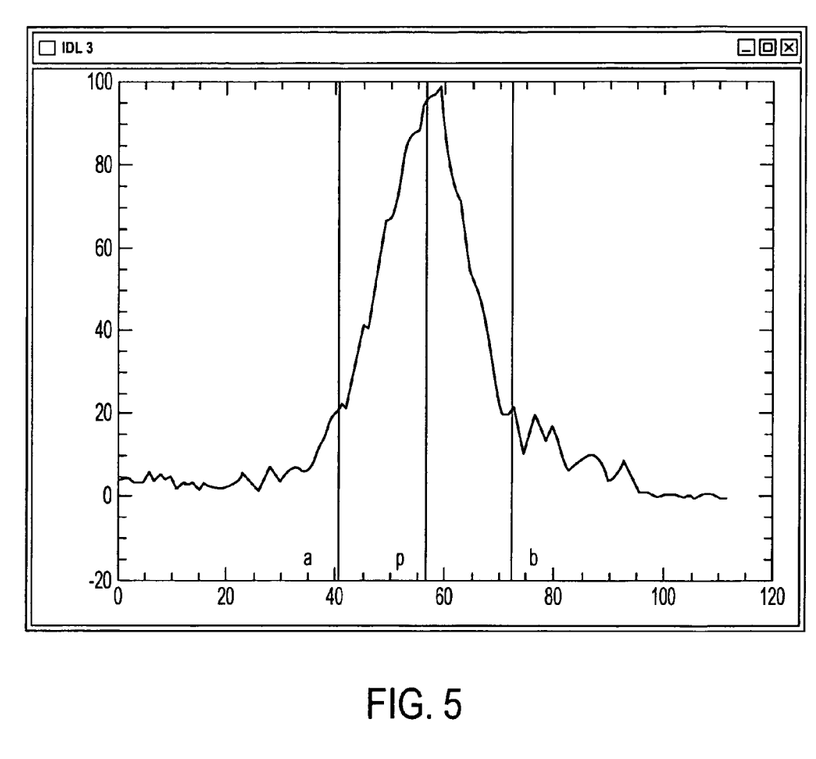
FIG. 5 is a graph showing a spectrum of a pixel and the detection of the center of an energy peak.

Locating the peak and adjusting the upper and lower boundary of the energy window for each pixel can be seen in FIG. 5. FIG. 5 displays the spectrum of a pixel (x, y), wherein there is an energy peak p, which is defined as the center of the Full Width at Half Maximum (FWHM). The boundary of the energy window is marked by point a and b. A Counts function is defined as follows:

$$C(a, b, x, y) = \int_a^b f(x, y, t) dt \quad (6)$$

In Equation (6), f(x, y, t) is the energy spectrum at the detector image location (x, y) and t is the energy in keV, which is represented as the horizontal axis in FIG. 5. The calibration uses a Co57 radiation source, with a 20% energy window. Set $$A(x, y) = 0.9 p(x, y) \quad (7)$$

and $$B(x, y) = 1.1 p(x, y) \quad (8)$$

The average energy over the Center Field of View (CFOV) can be calculated as $$\overline{C}(x, y) = \frac{1}{\Delta} \int \int C(A, B, x, y) dx dy \quad (9)$$

where Δ is the area of the FOV. Then the calibration is that for any pixel (x, y), a and b can be optimized such that $$C(a, b, x, y) = \overline{C}(x, y) \qquad (10)$$

Figure 6A:
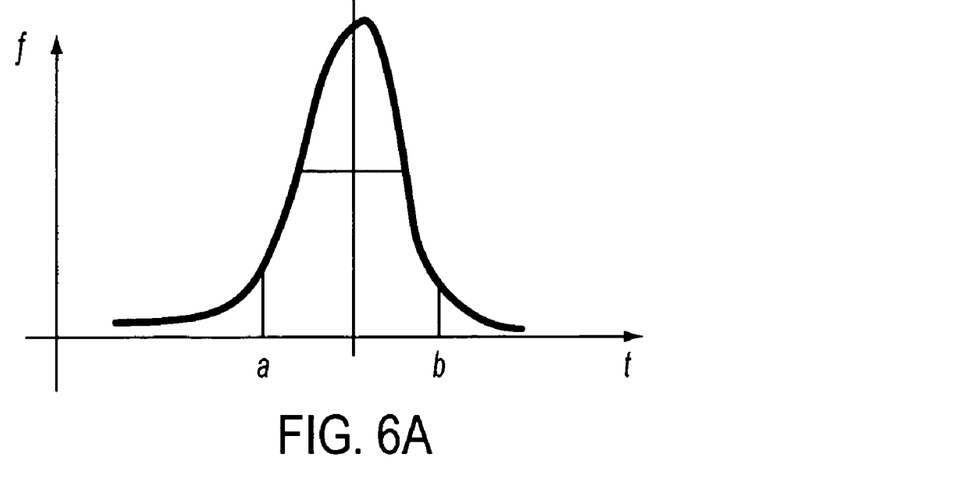
FIG. 6(a) is a graph of a calibrated standard energy spectrum.
Figure 6B:
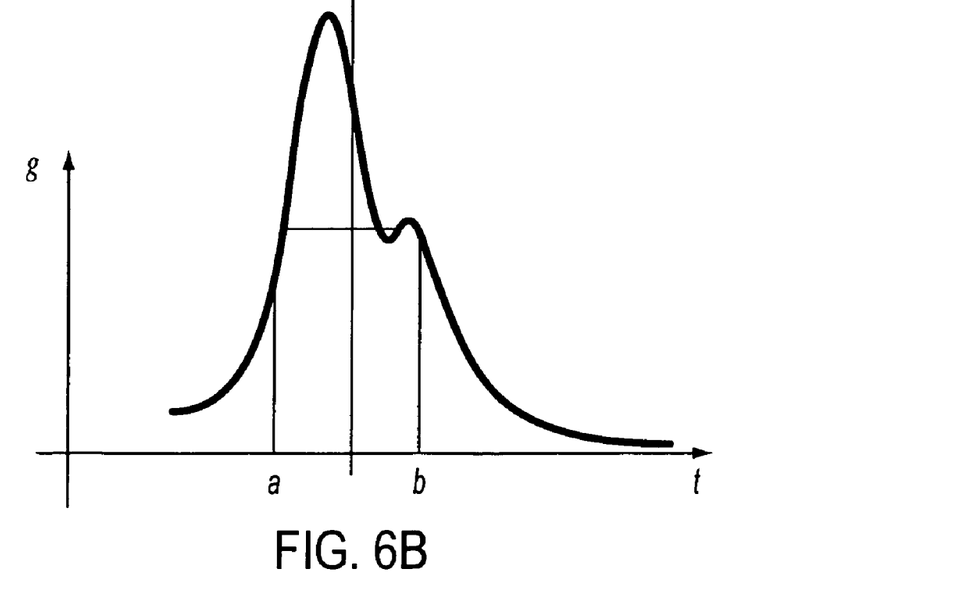
FIG. 6(b) is a graph of an energy spectrum to be calibrated in accordance with the calibrated spectrum of FIG. 6(a)

FIG. 6 describes the calibration for different energy spectra. Calibration is conducted in manufacturing only for Co57 as shown in FIG. 6(a). It is therefore necessary to scale the window for different energy spectra created by use of alternative radiation sources, as shown in FIG. 6(b). This can be achieved using the following equation method:

$$\int_a^b f(t)dt = \int_{a'}^{b'} g(t)dt \qquad (11)$$

The new boundary (a', b') is scaled for all pixels, therefore the new energy spectrum can be calibrated without acquiring any new flood data. Once energy is calibrated using the Co57, any other energy spectrum can be scaled to achieve the same uniformity. Therefore, for scanning patients or target subjects where the radiation source may not be Co57, such scaling would be required for proper imaging.

Figure 7A:
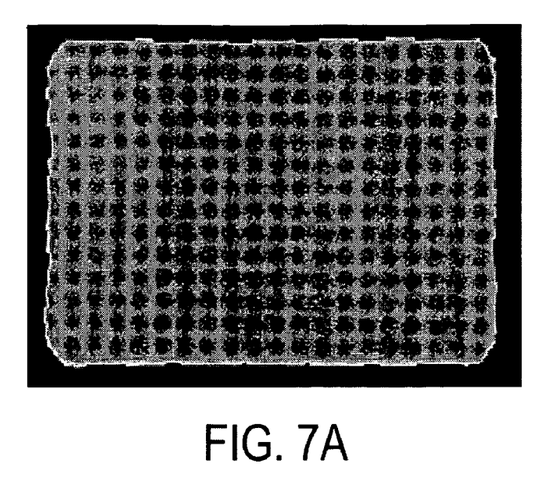
FIG. 7(a) shows a flood image acquired with a Zmap obtained with use of the present invention.
Figure 7B:
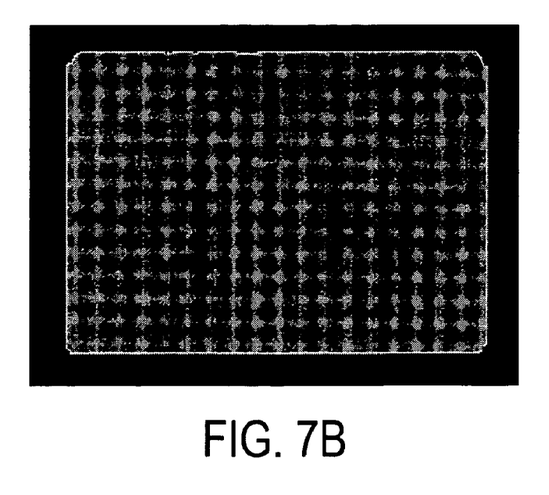
FIG. 7(b) shows a flood image acquired by use of the new generic Zmap and Twin Zmap in accordance with the present invention.

An example of the advantages of the invention can be seen in FIGS. 7(a) and 7(b). FIG. 7(a) shows a flood framed using the old Zmap, whereas FIG. 7(b) displays the flood framed using the present invention showing improved performance.

The invention having been described, it will be apparent to those skilled in the art that the same may be varied in many ways without departing from the spirit and scope of the invention. Any and all such modifications that would be apparent to those of skill in the art are intended to be covered by the following claims.

What is claimed is:

1. A method for calibrating a scintillation detector comprising the steps of:
   obtaining an initial generic Zmap that is characteristic of the detector type;
   applying a linearity correction to said initial generic Zmap to produce a refined generic Zmap;
   assembling an energy histogram matrix from a listmode flood data acquired from said refined Zmap, whereby a spectrum for each pixel can be obtained; and
   obtaining a Twin Zmap for said device, wherein said Twin Zmap optimizes for each pixel a lower and upper boundary of an energy window according to an average energy over a center field of view of said scintillation detector.

2. A method as in claim 1 wherein the linear correction is applied by
   acquiring a dot pattern image of a set of grids for the initial generic Zmap;
   extracting a second set of grids from the dot pattern images; and
   warping said initial generic Zmap according to said grid difference using morphological transformation.

3. A method as in claim 1 wherein the Twin Zmap is obtained by
   obtaining said spectrum for each pixel using Co57 as a radiation source, wherein a peak of said spectrum is a center of a full width half maximum of said spectrum;
   setting a 20% energy window;
   obtaining an average energy over a center field of view; and
   optimizing the energy window for each pixel such that the energy for each pixel is equal to the average energy over a field of view.

4. A method as in claim 1. further comprising
   scaling the energy window for a different energy spectrum according to the radiation source or target subject.

5. An apparatus for calibrating a scintillation camera, comprising: a scintillation detector; a processing unit communicating with said detector, and configured to apply a linear correction to a generic Zmap, assembling an energy histogram matrix from listmode data obtained from said corrected Zmap, and thereafter generating a Twin Zmap, wherein said Twin Zmap optimizes for each pixel a lower and upper boundary of an energy window such that the energy for each said pixel is equal to the average energy over a center field of view.

6. An apparatus as in claim 5, wherein said linear correction is calculated by obtaining a set of grids through a linear dot pattern, extracting a second set of grids from images of said linear dot pattern, and warping according to the grid difference using morphological transformation.

7. An apparatus as in claim 6 wherein said processor is further configured to scale the energy window for a different energy spectrum according to the radiation source or target subject.

8. An apparatus as in claim 6 wherein said processor is further configured to scale the energy window for a different energy spectrum according to the radiation source or target subject.

9. An apparatus as in claim 5, wherein said Twin Zmap is obtained by obtaining a spectrum for each pixel using Co57 as a radiation source for said energy histogram matrix, wherein a peak of said spectrum is a center of a full width half maximum of said spectrum;
   setting a 20% energy window;
   obtaining an average energy over a center field of view; and
   optimizing the energy window for each pixel such that the energy for each pixel is equal to the average energy over a field of view.

10. A method for calibrating a scintillation detector comprising the steps of:
    obtaining an initial generic Zmap that is characteristic of the detector type;
    applying a linearity correction to said initial generic Zmap to produce a refined generic Zmap;
    assembling an energy histogram matrix from a listmode flood data acquired from said refined Zmap using a calibration radiation source;
    generating a Twin Zmap by locating a peak in said energy histogram and determining lower and upper boundaries of said energy histogram defining a window wherein said lower and upper boundary of an energy window are determined such that the window defined by said lower and upper boundaries matches a predefined mean energy.

11. A method as in claim 10, wherein when using a second radiation source different from said calibration radiation source, the lower and upper boundaries of an energy histogram generated by said second radiation source are adapted such that the window defined by said lower and upper boundaries matches the predefined mean energy.

12. A method as in claim 10, wherein the linear correction is applied by
    acquiring a dot pattern image of a set of grids for the initial generic Zmap;
    extracting a second set of grids from the dot pattern images; and
    warping said initial generic Zmap according to said grid difference using morphological transformation.

13. A method as in claim 10, wherein the Twin Zmap is obtained by obtaining said spectrum for each pixel using Co57 as a radiation source, wherein a peak of said spectrum is a center of a full width half maximum of said spectrum;

setting a 20% energy window;

obtaining an average energy over a center field of view; and optimizing the energy window for each pixel such that the energy for each pixel is equal to the average energy over a field of view.

14. A method as in claim 10, further comprising scaling the energy window for a different energy spectrum according to the radiation source or target subject.

15. An apparatus for calibrating a scintillation camera, comprising:

a scintillation detector;

a processing unit communicating with said detector, and configured to apply a linear correction to a generic Zmap, assembling an energy histogram matrix from list-mode data obtained from said corrected Zmap, and thereafter generating a Twin Zmap by locating a peak in said energy histogram and determining lower and upper boundaries of said energy histogram defining a window wherein said lower and upper boundary of an energy window are determined such that the window defined by said lower and upper boundaries matches a predefined mean energy.

16. An apparatus as in claim 15, wherein when using a second radiation source different from said calibration radiation source, the processing unit is operable to adapt the lower and upper boundaries of an energy histogram generated by said second radiation source such that the window defined by said lower and upper boundaries matches the predefined mean energy.

17. An apparatus as in claim 15, wherein said linear correction is calculated by obtaining a set of grids through a linear dot pattern, extracting a second set of grids from images of said linear dot pattern, and warping according to the grid difference using morphological transformation.

18. An apparatus as in claim 15, wherein said Twin Zmap is obtained by obtaining a spectrum for each pixel using Co57 as a radiation source for said energy histogram matrix, wherein a peak of said spectrum is a center of a full width half maximum of said spectrum;

setting a 20% energy window;

obtaining an average energy over a center field of view; and optimizing the energy window for each pixel such that the energy for each pixel is equal to the average energy over a field of view.

* * * * *